United States Patent

[11] 3,604,756

| [72] | Inventor | Peregrinus Gruber<br>Chicago, Ill. |
|---|---|---|
| [21] | Appl. No. | 789,154 |
| [22] | Filed | Jan. 6, 1969 |
| [45] | Patented | Sept. 14, 1971 |
| [73] | Assignee | Circle Engineering Co., Inc.<br>Chicago, Ill. |

[54] PLASTIC VEHICLE WHEEL
3 Claims, 5 Drawing Figs.

[52] U.S. Cl. .................................................. 301/63 R,
301/63 PW, 301/64 SD
[51] Int. Cl. .................................................... B60b 5/00
[50] Field of Search ........................................ 301/63, 64;
152/7

[56] References Cited
UNITED STATES PATENTS
922,161  5/1909  Lanyon .................... 301/65 UX

| D.192,417 | 3/1962 | Hulterstrum ............... | 301/63 UX |
| 2,684,099 | 7/1954 | Henry ........................... | 152/7 |

FOREIGN PATENTS

| 247,211 | 9/1963 | Australia .................. | 301/63 PW |
| 642,417 | 1/1964 | Belgium .................... | 301/63 PW |
| 240,075 | 8/1962 | Australia .................. | 152/7 |

Primary Examiner—Richard J. Johnson
Attorney—Silverman & Cass

ABSTRACT: A plastic vehicle wheel for domestic and industrial use comprising a single molded member having a hub and a rim, with the intervening web formed as an imperforate sinuous ribbon folded back and forth around the wheel and having its body everywhere lying substantially on radii of the wheel so that compression resisting column or spoke means are formed which is much longer than the direct circumferential distance about the wheel at any radial point on said web.

PATENTED SEP 14 1971

3,604,756

INVENTOR
Peregrinus Gruber
BY Silverman
ATTORNEYS

PLASTIC VEHICLE WHEEL

FIELD OF THE INVENTION

The field of this invention is the construction of small wheels for use industrially and domestically.

Such wheels are needed for lawn mowers, toy vehicles, carts and, in the case of industry, for merchandise carriers. The particular wheel contemplated by the invention has a plastic molded body, using the injection-molding technique for forming the same, and is provided with some form of resilient tire and a bearing. The bearing may be metal.

Plastic wheels are known to have little strength in compression whereby their use in industry heretofore has been considered inadvisable. In domestic use the loads to which such wheels are subjected are not as great as in industry.

The structure of the invention utilizes a novel web arrangement to achieve a remarkable strength for the wheel but without bulk and weight. The plastic resins used are expensive and economy of use is important. The construction of the wheel is such that very little volume of the plastic is needed to achieve the load-supporting strength of the wheel.

SUMMARY OF THE INVENTION

According to the invention, the body or web of the wheel is molded integral with the rim and the bearing housing, but the configuration of the web is substantially that of a ribbon of sinuous configuration extending between the rim and bearing g the ribbon being relatively thin but having its width arranged in a radial direction to provide compression strength along its entire length. Considering the circumferential length of the ribbon developed, such length is substantially longer than the circumference of the wheel at any radial distance from the center thereof.

The undulations or waves resulting from the sinuousity of the ribbon give the appearance of spokes to the wheel. The rim and bearing housing combine with the ribbon to form an extremely rigid and strong wheel.

The undulations are angularly equally spaced about the wheel.

SHORT DESCRIPTION OF THE DRAWING

Figure 1:
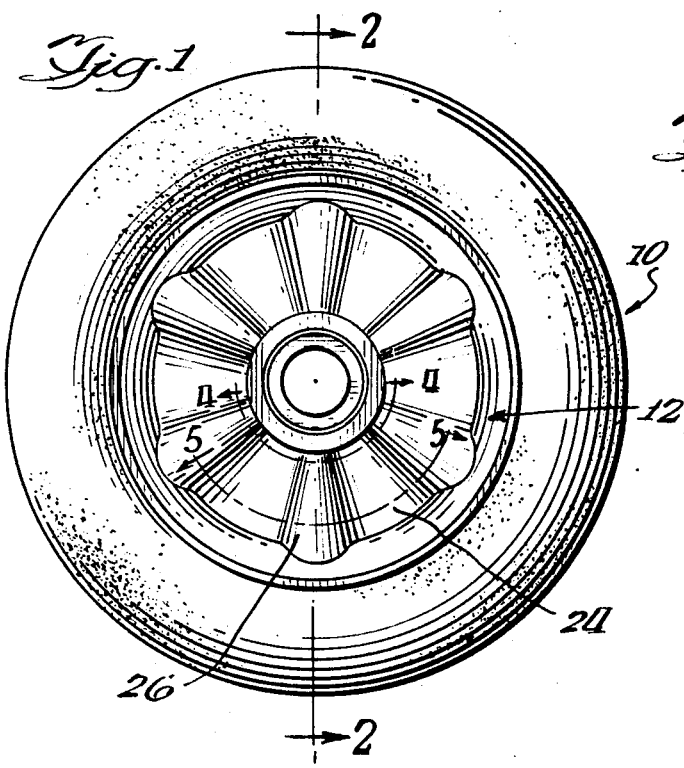
FIG. 1 is a side elevational view of the wheel of the invention having a bearing in place and a tire mounted on its rim.
Figure 4:
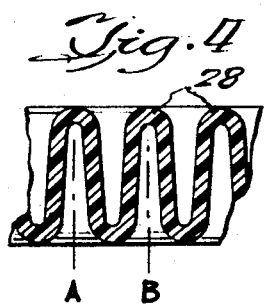
Figure 5:
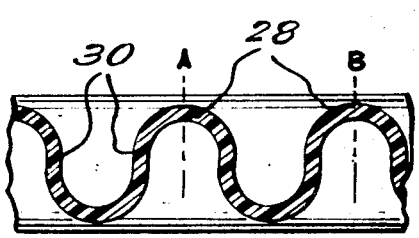

FIGS. 4 and 5 are fragmentary developed views showing several of the waves or undulations of the ribbon forming the body of the wheel of FIG. 1 along the lines 4—4 and 5—5 respectively and looking in the indicated directions.

DESCRIPTION OF THE PREFERRED EMBODIMENT

The wheel 10 of the invention is comprised of a body 12 of molded rigid plastic material of sufficient strength to afford resistance to compressive force applied transverse of the wheel axis; having a hub 14 in which there is normally mounted a bearing 16. The bearing is shown here as a simple sleeve of metal, but it could be a ball or roller bearing. The outer rim 18 of the wheel is grooved at 20 to accept any form of tire, such as, for example, the annular rubber tire 22 represented in the drawing. If used, such a tire is expanded and snapped into the groove 20, the opening thereinto defined by parallel circumferential lips 21.

The invention is not concerned with the construction of the bearing 16 or the tire 22. A commercially acceptable wheel 10 will normally have these two components. It should be appreciated that the simplest form of wheel could consist of a rim which does not require a tire 22 and hence is provided with a cylindrical or convex outer face to roll directly on a surface; a hub which forms its own bearing; and the intermediate web which is described in detail hereinafter.

The web 24 of the wheel 10 is integral with the hub 14 and the rim 18 being molded therewith in a single operation. Any suitable molding technique may be used. The web consists of a plurality of undulations or waves 26 of which there are six, shown best in FIG. 1. A full wave is considered a reverse bend from crown 28 to crown 28 of the undulations. This would be from point A to B in FIGS. 4 and 5. The waves are closer together at smaller radial distances from the center of the wheel as will be seen from a study of FIGS. 4 and 5.

Although the web 24 is molded, it presents the appearance of a ribbon, folded back and forth upon itself in a series of waves, installed between the annular hub 14 and rim 18. The ribbon is connected integrally with the hub 14 and rim 18 at its radially inner and outer edges, and is formed so that substantially everywhere along its length (considered in a circumferential sense) it provides radial column or spoke means to resist compression, each spoke thereof having its proximal edge along a substantial portion of the hub and its distal edge following the contour of the rim.

The external appearance of the wheel 10 is that of a spoked construction, but it will be obvious that where the web 24 is convex on one face, it is correspondingly concave on the other. Thus, the principles of the invention may be applied in the construction of wheels of different appearances as for example, by varying the number of undulations, by making the undulations angular instead of smooth as shown, by making the crowns 28 of the undulations flat or otherwise configured, etc.

The undulations are substantially closer together at the hub 14 than at the rim 18, as previously mentioned. In FIG. 4 then undulations are shown substantially closer together than in FIG. 5 although they are sections through the same undulations. Only a little more than two complete undulations are shown in FIG. 5 while almost three are illustrated in FIG. 4. The undulations are equally spaced angularly about the wheel. In the example illustrated, there is a complete undulation, crown to crown, every 60°.

Figure 3:
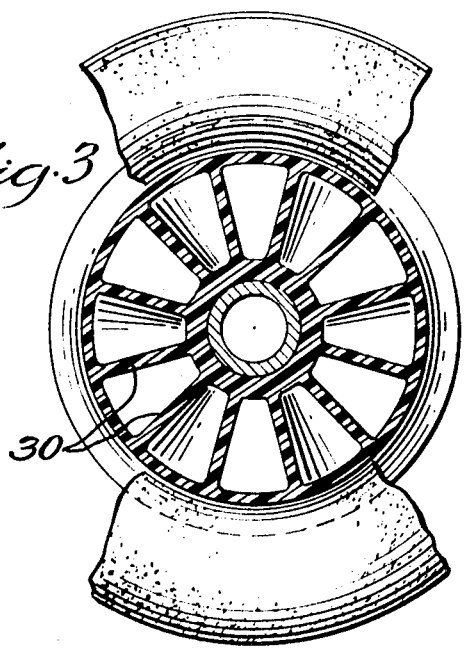
FIG. 3 is a vertical sectional view through the wheel on a plane perpendicular to the axis thereof.

It is preferred that all of the parts of the undulations lie on radii of the wheel for maximum strength. Thus, in a vertical section through the wheel, as illustrated in FIG. 3, the sides 30 of the undulations not only appear as spokes, but function as rectangular cross section spokes or columns whose larger dimensions generally define planes meeting at the axis of the wheel. This ignores the curved or arcuate ends which form the crowns 28, but is an aid to understanding the invention. Preferably also, the crowns also form spokes on radii of the wheel 10.

In FIG. 3 it appears that there are 12 spokes, when in fact there are six undulations. From either face the wheel will appear to have six spokes of rounded configuration.

Figure 2:
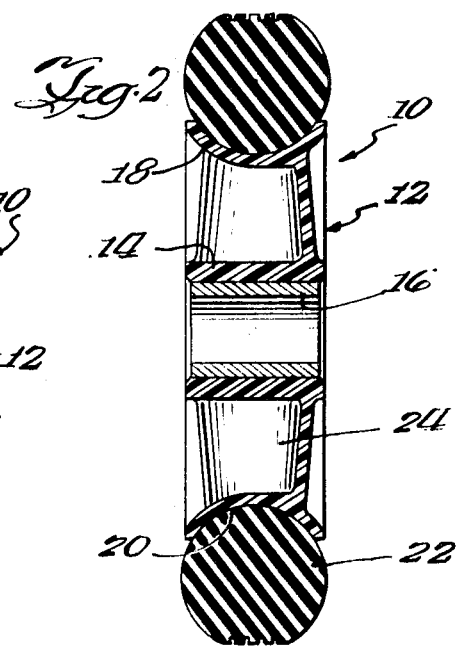
FIG. 2 is a vertical sectional view through the same on the line 2—2 of FIG. 1 and taken in the indicated direction.

As can be seen in the drawings, the sides 30 of the undulations each have a complementary diametrically opposite side in the same plane taken through the axis of the hub. The sides are disposed in radial planes generally parallel relative to each other and perpendicular to the axis of the hub. It can be seen, referring to FIG. 2, that the overall depth of each of the spokes take along the hub and parallel to the axis of the hub, is substantially the same as the width of the rim considered as the inner distance between the lips 21 of the said rim. The overall depth of the spoke taken at the rim is only slightly less than the depth of the spoke taken at the hub. It is believed that this is one of the contributing factors for the unusual strength of the wheel and its resistance to the compressive deformation. This is particularly unusual because of the minimum amount of material comprising the intervening web of the wheel. As also can be seen in FIG. 2, the proximal ends of each of the spokes engage the hub over substantially the full length of the hub.

The dimensions through the undulations, that is, the thickness of the apparent ribbon, is substantially less than would be needed to provide the strength of a wheel such as that of the invention, if constructed conventionally. Thus, besides strength, the wheel of the invention is economical.

It will be noted that because of the use of injection molding, the axial distance from face to face of the wheel measured a the undulations can be quite substantial, and in most cases greater than the actual distance between sides 30. This gives great strength in small space with very thin web walls. This structure cannot be achieved by stamping techniques in very small wheels, considering that the wheel of the invention is molded as an integral member.

What it is desired to secure by Letters Patent of the United States is:

1. A vehicle wheel comprising an integral molded member of rigid plastic material of sufficient strength to afford resistance to compressive force applied transverse of the axis of the wheel, said member comprising a hub, a rim having parallel circumferential lips, and an intervening web, said intervening web being in the form of a continuous ribbon having a plurality of undulations angularly spaced symmetrically radially about the hub, said undulations defining spoke means comprised of alternating spokes and each spoke having side portions and a bridging crown portion, said side portions each having a complementary diametrically opposite side portion in the same plane taken through the axis of the hub, the said sidewalls being disposed in radial planes substantially parallel to the axis of the hub at both the hub and the rim, the overall depth of each of the spokes taken along the hub and parallel to the axis thereof being substantially the same as the width of the rim considered as the distance between the lips of said rim and the overall depth of the spoke taken at the rim being only slightly less than the depth of the spoke taken at the hub, said radial planes meeting at the axis of the hub, the circumferential length of the ribbon being substantially longer than the circumference of the wheel at any radial distance from the center thereof, and each of said spokes having proximal ends engaging the hub over substantially the full length of the hub and distal ends engaging the rim, the distal ends each including a section following the rim contour directly across the width of the rim.

2. The wheel as claimed in claim 1 in which all parts of the ribbon substantially lie on radii of the wheel.

3. A wheel as claimed in claim 1, wherein the axial distance between the faces, measured at the undulations, is greater than the distance between two adjacent sides.